United States Patent [19]
Konishi

[11] Patent Number: 4,574,319
[45] Date of Patent: Mar. 4, 1986

[54] ELECTRONIC CAMERA HAVING NON-IMAGE DATA RECORDER

[75] Inventor: Masahiro Konishi, Saitama, Japan

[73] Assignee: Fuji Photo Film Co., Ltd., Japan

[21] Appl. No.: 374,171

[22] Filed: May 3, 1982

[30] Foreign Application Priority Data

May 12, 1981 [JP] Japan ................................. 56-71144

[51] Int. Cl.$^4$ ............................................. H04N 5/76
[52] U.S. Cl. .................................. 358/335; 358/906;
358/209; 352/92; 360/35.1; 360/14.3
[58] Field of Search ................. 352/5, 31, 92, 129,
352/236, 244; 354/105; 360/33.1, 35.1, 14.3;
358/335, 108, 97, 903, 906, 209, 212, 213

[56] References Cited
U.S. PATENT DOCUMENTS

| | | | |
|---|---|---|---|
| 3,877,799 | 4/1975 | O'Donnell | 352/92 |
| 4,150,882 | 4/1979 | Konick | 352/92 |
| 4,215,920 | 8/1980 | Butler | 352/92 |

FOREIGN PATENT DOCUMENTS

| | | | |
|---|---|---|---|
| 54-154219 | 12/1979 | Japan | 358/906 |
| 1254295 | 11/1971 | United Kingdom | 360/14.3 |

*Primary Examiner*—Robert L. Richardson
*Attorney, Agent, or Firm*—Saidman, Sterne, Kessler & Goldstein

[57] ABSTRACT

An electronic camera having an electronic memo, which comprises a photographic lens, an image device for receiving the image information from the photographic lens and converting it to an electric signal, a mechanism for recording the image data output signal fed from the image pickup device on a magnetic recording medium, and a device for recording data other than the image data on the same recording medium on which the image data is recorded. The device for recording the data other than the image data has functions to encode the data and record it on the same recording medium. The data other than the image data encompass both data concerning the photographed image and data for image reproduction processing.

28 Claims, 5 Drawing Figures

ELECTRONIC CAMERA HAVING NON-IMAGE DATA RECORDER

BACKGROUND OF THE INVENTION

1. Field of the Invention

This invention relates to an electronic camera in which image information obtained by an image pickup device is electrically processed and recorded on a recording medium.

2. Description of the Prior Art

In certain types of conventional cameras using silver halide photographic materials, photographic data is recorded on the recording medium in addition to object image information. With such conventional cameras, only the data of photographing can be optically recorded as superposed on the object image information, and it is extremely difficult to record various other data such as shutter speed, aperture value, frame number, place of photographing, name of photographer and object, on the same recording medium on which the object image information is recorded. However, it would be very convenient for the purpose of later reproduction of image information or arrangement of recording media to record the above-mentioned data on the same recording medium on which the image information of the object is recorded.

Further, in the reproduction (for example, printing) of the image information recorded by use of the above-described conventional cameras using silver halide photographic materials, it is a general practice to compensate for the color temperature or the like so as to achieve image reproduction as precisely as possible. However, because the compensation must be conducted by presuming a compensation value based on the image information recorded on the recording medium, it is difficult to precisely reproduce the iamge information and, in spite of steady improvements being made in compensation theory, it still often happens that the presumed value is completely wrong. To eliminate the disadvantage of the conventional system and obtain a precisely reproduced image, it would be effective to record the data necessary for image reproduction processing on the same recording medium on which the object image information is recorded and to reproduce the image information by compensation based on the recorded compensation data. As described above, however, it is impossible with conventional cameras using silver halide photographic materials to record the data necessary for image reproduction processing on the same recording medium on which the image information is recorded.

More recently, an attempt has been made to develop an electronic camera using an image pickup device such as a charge coupled device (CCD), pickup tube or the like. In the electronic camera, the light information is once converted to an electric signal by the image pickup device, and the obtained electric signal is then recorded on a recording medium such as magnetic tape. Accordingly, with the electronic camera, it is possible to easily record various kinds of data on the same recording medium on which the object image information is recorded, by converting the data to electric signals. Further, even if all of the various kinds of data exemplified above are input into the system, the quantity of the electric signals converted from them is very small compared with that of the electric signals converted from the object image information. For example, all of the above-mentioned data can be recorded with a signal quantity corresponding to between several picture elements and several tens of picture elements of the digitized object image information. This level of signal quantity is obviously very small compared with the signal quantity of the object image information which generally converted into signals corresponding to between tens of thousands of picture elements and hundreds of thousands of picture elements. Further, because the photographing record data and/or the data for image reproduction processing are stored on the recording medium in the form of electric signals, these data can freely be indicated on the reproduced image and/or used at discretion to conduct processing, e.g. compensation, of the electric image signals. Accordingly, all data which are likely to be required later can be recorded on the recording medium.

SUMMARY OF THE INVENTION

The primary object of the present invention is to provide an electronic camera having an electronic memo, in which any desired data can be recorded on the same recording medium on which the image information is recorded.

Another object of the present invention is to provide an electronic camera having an electronic memo, in which the data recorded on the same recording medium on which the image information is recorded can be used for various types of processing for image reproduction at the discretion of the operator.

The specific object of the present invention is to provide an electronic camera having an electronic memo, which allows accurate compensation for image reproduction.

The above objects can be accomplished by an electronic camera having an electronic memo and comprising a photographic lens, an image pickup device for receiving the image information from said photographic lens and converting said image information into an electric signal, and a mechanism for recording the image data output signal fed from said image pickup device on a recording medium, characterized in that said camera is provided with a means for recording data other than said image data on the same recording medium as said recording medium on which said image data is recorded.

The data other than the image data generally encompass data concerning the photographed image, such as date of photographing, shutter speed, aperture value, frame number, place of photographing, name of photographer, and object; data for image reproduction processing, such as color temperature, defective picture element address for indicating the position of any defective picture element occurring when the image pickup device is manufactured, information on the arrangement of the color filter array, identification code for discriminating between continuous shooting and single frame shooting modes, and instructure signal for maintaining a secrecy or preventing a defective record section from being reproduced; and memo information such as simple note made on trip (for example, amount of expense or the like). In accordance with the present invention, these data are recorded on the same recording medium on which the object image information is recorded, and in the same camera that is used to record the image information.

DESCRIPTION OF THE PREFERRED EMBODIMENTS

The present invention will hereinbelow be described in further detail with reference to the accompanying drawings.

Figure 1:
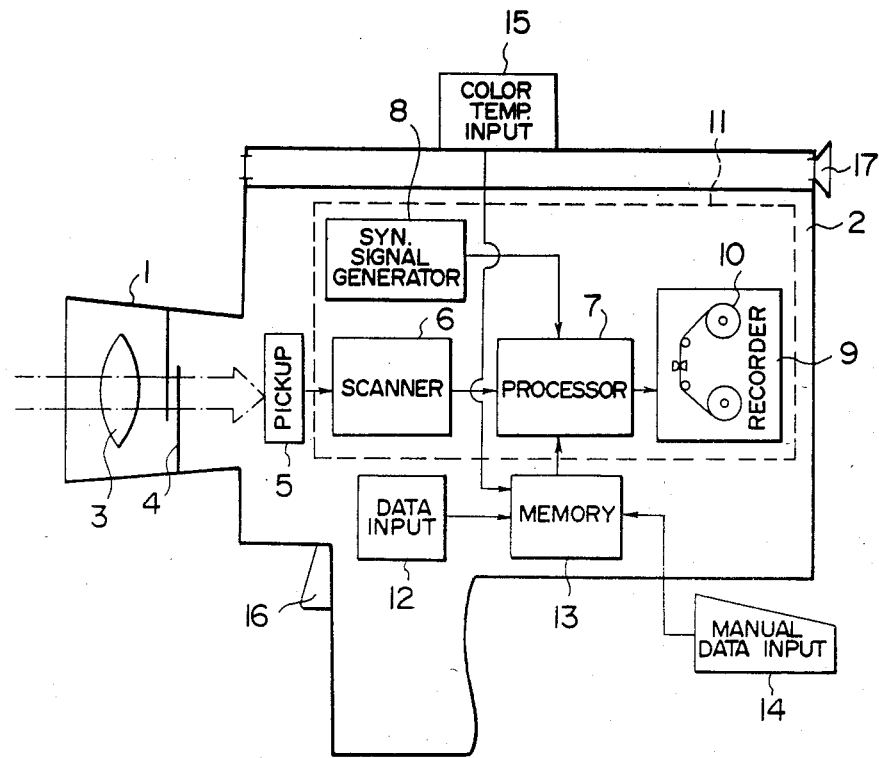
FIG. 1 is a schematic view showing an embodiment of the electronic camera having an electronic memo in accordance with the present invention.

FIG. 1 schematically shows a preferred embodiment of the electronic camera in accordance with the present invention.

The electronic camera of the present invention is used to take still image or motion image photographs and has a camera body 2 provided with a lens mount 1 like a conventional camera using silver halide photographic materials. In the lens mount 1 are located a photographic lens 3 and shutter 4, which have configurations similar to those of a conventional camera. An image pickup device 5 is located at the position of image formation of the photographic lens 3, namely the position of the film surface in a conventional camera. The image pickup device 5 may be a solid state image pickup device constituted by a charge coupled device (CCD) or the like or may be a pickup tube such as a vidicon. In the embodiment shown in FIG. 1, a solid state image pickup device constituted by a CCD is used as the image pickup device 5. The CCD comprises a plurality of rectangularly-arranged photoelectric conversion picture elements having the function of photoelectric conversion for constituting respective picture elements. An image of the object to be photographed is formed on the image pickup device 5 by the photographic lens 3 and, in the case of photographing a still image, the time of exposure of the image pickup device 5 to the image information light is adjusted by the shutter 4.

When the image is formed on the image pickup device 5, each photoelectric conversion picture element constituting the image pickup device 5 generates an electric signal according to the light intensity received thereat, and temporarily stores the electric signal. The electric signal stored in the photoelectric conversion cells is then sequentially output from a scanner 6 to a signal processor 7. The signal processor 7 has an amplifier, a quantizer or the like, and performs processing operations such as amplification, encoding or the like of the electric signal fed from the scanner 6. The electric signal thus processed is then recorded on a recording medium 10, which is releasably fitted on a recorder 9, as the image data is recorded by the recorder 9 according to a synchronizing signal generated by a synchronizing signal generator 8. The recording medium 10 may be a magnetic tape as shown or may be a magnetic disk, magnetic drum or the like. The scanner 6, the signal processor 7, the synchronizing signal generator 8 and the recorder 9 together constitute a recording controller 11. The recording controller 11 may be of the type described for example in U.S. Pat. No. 4,131,919 when still image photographs are to be taken, and in U.S. Pat. No. 3,962,725 for the purpose of motion image photographs.

Among the above-mentioned data other than the image data, those data which are automatically recorded at the time of taking a photograph, such as date of photographing, aperture value, shutter speed, frame number or the like, are encoded and output to a data memory 13 by a data input unit 12. A manual data input unit 14 is also provided to manually set and encode the data, which cannot automatically be recorded at the time of taking a picture, before or after taking a picture and to output the encoded data to the data memory 13. Examples of the data of this type are the place of photographing, name of photographer, object, identification number to be attached to the corresponding record section for maintaining secrecy, data for indicating that the record is defective, and simple information such as characters or numerals.

Figure 2:
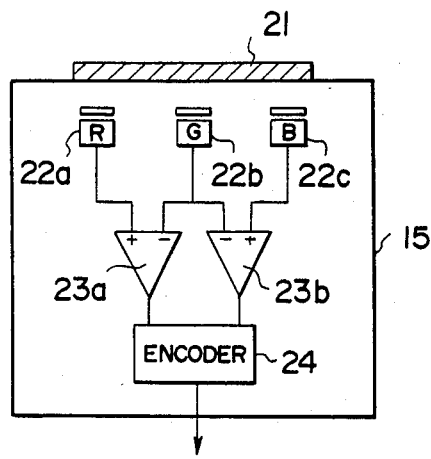
FIGS. 2 and 3 are schematic views showing the embodiments of the input unit for color temperature compensation information used in the electronic camera in accordance with the present invention.
Figure 3:
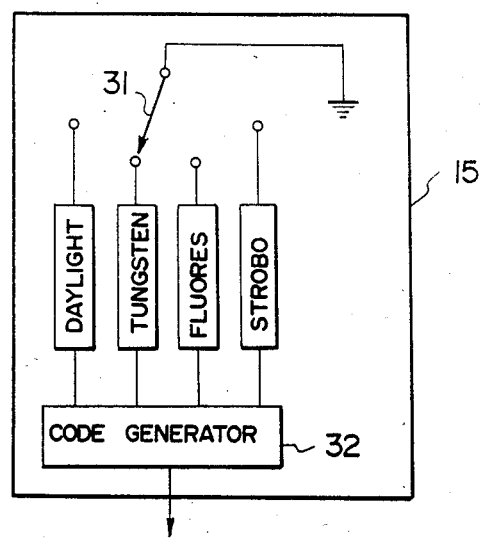

Further, a color temperature information input unit 15 is used to input color temperature information to the recording medium 10 for the purpose of compensating for the color temperature when the image information recorded on the recording medium 10 is reproduced. The data on the color temperature is encoded by the color temperature information input unit 15 and sent to the data memory 13. The color temperature information input unit 15 may for example be of the type shown in FIG. 2 in which the illuminating light transmitted through a light diffusing plate 21 located at the top of the unit 15 is measured by sensors 22a, 22b and 22c respectively having sensitivities at R (red), G (green) and B (blue) regions. The output signas obtained in accordance with the intensities of the respective incident light regions are then converted to differential signals of R minus G, and B minus G by differential amplifiers 23a and 23b. Thereafter, the differential signals thus obtained are encoded by an encoder 24 and sent to the aforesaid data memory 13. With the color temperature information input unit 15 shown in FIG. 2, it is possible to automatically measure and record the color temperature by the camera itself. Alternatively, the color temperature information input unit 15 may be of the type shown in FIG. 3 in which the photographer discriminates the kind of the illuminating light from among daylight, tungsten light, fluorescent light and strobe. In this case, a switch 31 is manually connected with a contact corresponding to the illuminating light, and the data encoded accoding to the illuminating light used is output from a code generator 32 to the aforesaid data memory 13.

The addresses of defective picture elements of the image pickup device 5, information on the arrangement of the color filter array provided on the surface of the image pickup device 5, or the like, are already fixed when the image pickup device 5 is manufactured. Data of this type may for example be output as the data for compensation in image reproduction when the data is recorded on the recording medium by use of a ROM (read only memory) for encoding and storing these data in the data memory 13. The above-mentioned code for discriminating between continuous shooting and single frame shooting modes of the photographed image may be recorded by using the members for indicating these modes in the camera body, or may be automatically recorded by detecting the shutter operation.

The camera body 2 is also provided with a shutter button 16, view finder 17 or the like as in the case of a conventional camera.

The above-described various data to be recorded together with the image data are input to the recording medium as described below. For example, information on defective addresses for indicating the positions of defective picture elements of the image pickup device 5, information on the arrangment of the color filter array provided on the surface of the image pickup device 5, information which is already fixed when the image pickup device 5 is manufactured and which effects all image information recorded, the code for keeping the whole record secret, or the like, are automatically recorded by the ROM for encoding and storing these types of information in the data memory 13 when the loading of the recording medium 10 into the camera body 2 is detected. Or, such information is manually input to the recording medium 10 by use of the manual data input unit 14 after recording medium 10 loaded into the camera body 2. The data automatically recorded at the time of taking a picture, for example, date of photographing, aperture value, shutter speed, frame member or the like, are recorded within the frame of the image information (in a position adjacent to the image information recording position) via the data input unit 12 and the data memory 13 in synchronization with the recording of the image information of the recording medium 10. Those data which cannot be automatically input to the recording medium 10 when a photograph is taken, for example, place of photograping, name of photographer, object, various memo information, or the like, may be recorded within the frame of the image information in the same way as the above-mentioned data which are automatically recorded at the time of taking a picture. Or, insofar as the signals of the latter mentioned data can be separated from those of other data, these data may also be recorded within the next adjacent frame of image information.

Figure 4:
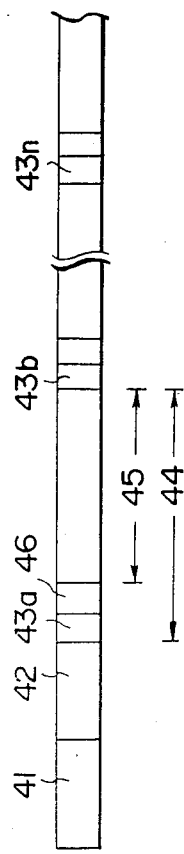
FIG. 4 is an explanatory view showing the data structure of the recording medium used in the electronic camera in accordance with the present invention.

FIG. 4 shows an example of the data structure on the recording medium 10 on which various data have been recorded as described above. At the beginning of the recording medium 10 are recorded an identification number 41, address 42 of defective picture element, information on the arrangement of the color filter array, or the like. The remaining portion of the recording medium 10 is divided to frames by synchronizing signals 43a, 43b, ..., 43n. Each frame 44 comprises image data 45 and coded non-image data 46. It is of course possible to record the identification number 41, address 42 of defective picture element, information on the arrangement of the color filter array, or the like, within the region of the coded non-image data 46 in one frame 44 or, insofar as the coded data 46 can be separated later from other data, the coded data 46 may be recorded in another frame. In the data structure shown in FIG. 4, the image data 45 and the coded data 46 are recorded in different portions of the one frame 44. However, in so far as both data 45 and 46 are recorded separably from each other, they may also be recorded in the same portion of one frame 44.

In an image reproducing apparatus for reproducing the image information, the above-described various non-image data, which have been recorded on the recording medium together with the image data, are displayed or recorded together with or independently from the image data, or used for image reproduction processing. Namely, the data on photographing record, memo information, or the like are displayed or recorded on a cathode ray tube (CRT) or a print together with the image data, or displayed by an exclusive display unit installed separately from the reproducing apparatus.

Further, the data for image reproduction processing, such as color temperature, address of defective picture element, information on arrangement of the color filter array, or the like, are detected by an exclusive detector installed in the image reproducing apparatus, and used for compensation in image reproduction.

Figure 5:
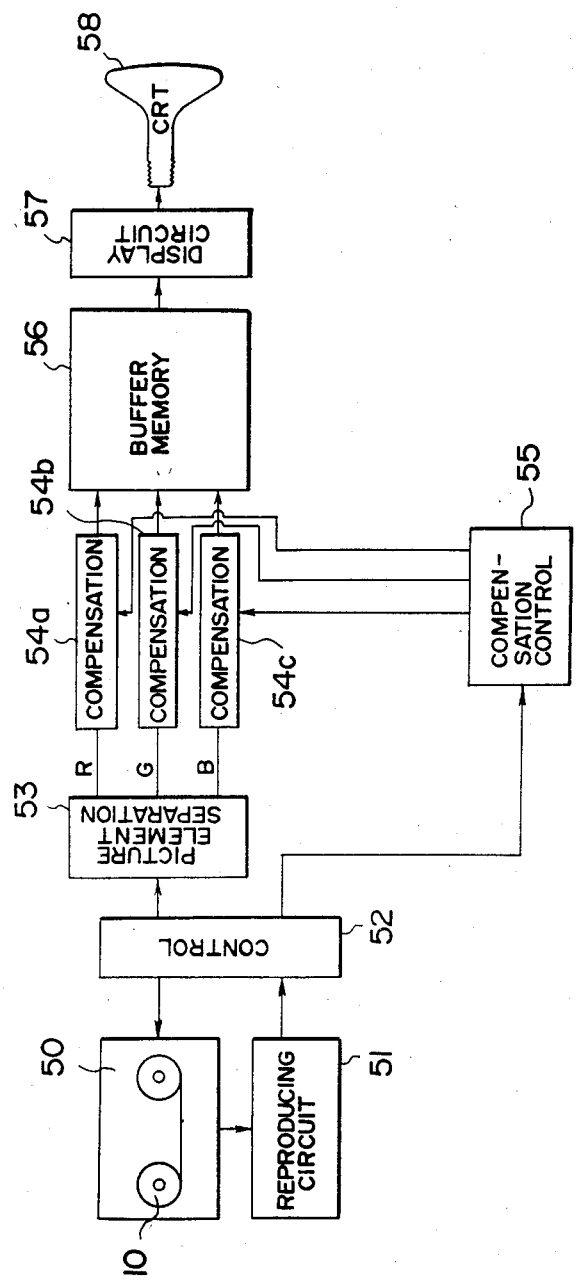
FIG. 5 is a block diagram showing an example of the reproducing apparatus for the image information recorded by use of the electronic camera in accordance with the present invention.

FIG. 5 schematically shows an example of the reproducing apparatus for carrying out the color temperature compensation or reproduced image based on the recording medium on which the color temperature compensation signal is recorded by use of the electronic camera in accordance with the present invention.

In FIG. 5, the reproducing apparatus comprises the recording medium 10 on which various non-image data are recorded together with the image information by use of the electronic camera having electronic memo in accordance with the present invention, a drive unit 50 and a reproducing circuit 51 for reproducing the recording medium 10, a reproduction control 52 for controlling said drive unit 50 and separating the output signal sent from said reproducing circuit 51 into the image data and the non-image data, a color picture element separating circuit 53 for separating the image data output from said reproduction control 52 into the R, G and B primary color signals, color temperature compensating circuits 54a, 54b and 54c for compensating for the R, G and B primary color signals based on the color temperature data in said non-image data sent from said reproduction control 52, a color temperature compensation control circuit 55 for controlling said color temperature compensating circuits 54a, 54b and 54c, a buffer memory 56 for temporarily storing the R, G and B primary color signals compensated for color temperature, a display circuit 57 and a CRT 58 for displaying the signals stored in said buffer memory 56.

In the reproducing apparatus shown in FIG. 5, the image information is reproduced from the recording medium as described below.

The drive unit 50 is actuated to move the recording medium 10 by an instruction given from the reproduction control 52 and, for example, the identification number recorded at the beginning of the recording medium 10 is read by reproducing circuit 51. Based on the identification number, the reproduction control 52, for example, checks whether it is a required or predetermined number and, if not, the reproduction control 52 stops the drive unit 50 to terminate the reading of the recording medium 10. If the identification number read is the predetermined one, the reading of the recording medium 10 is continued and the information contained in the first frame is read out. In this case, the reproduction control 52 may determine whether to reproduce the image data contained in each frame by further reading the corresponding instruction signal. A frame not to be reproduced may immediately be transferred by the drive unit 50 so as to start reading the information in the next frame. As for the frame to be reproduced, the color temperature and the image data contained therein are read out. Then, the image data is separated from the color temperature data by the reproduction control 52 and sent to the color picture element separating circuit 53, where the image data is separated into the R, G and B primary color signals, which are in turn sent to respective color temperature compensating circuit 54a, 54b and 54c. Meanwhile, the color temperature data separated from the image data by the reproduction control 52 is sent to the color temperature compensation control circuit 55 to calculate the compensation values. The compensation values are used to control the color temperature compensating circuits 54a, 54b and 54c to obtain well-balanced R, G and B primary color signals. The R, G and B signals compensated for color temperature are then temporarily stored in the buffer memory 56 and used to display the image on the CRT 58 via the display circuit 57. In this way, color balance compensation is conducted based on the color temperature information recorded on the recording medium at the time of photographing, and the image reproduction is carried out for each frame. When the above-mentioned CRT 58 is replaced by a photographic printer, it is possible to obtain a print precisely compensated for color balance on the basis of the color temperature information recorded on the recording medium at the time of photographing.

While the compensation in image reproduction has been described above with reference to the color temperature data, it is also possible to obtain displayed or reproduced image unaffected by any defective picture element(s), which the image pickup device may have, by detecting the address data of the defective picture element in the reproducing apparatus and using the known signal interpolation technique between the signals from the picture elements adjacent to the defective picture element.

Further, in case the image is photographed in the continuous shooting mode, it is possible to obtain a motion image by detecting the code recorded on the recording medium by the electronic camera to indicate the continuous shooting mode and the single frame shooting mode, and continuously reproducing the related image frames, for example at a certain interval in the reproducing apparatus.

As described above, the electronic camera in accordance with the present invention is provided with a means for encoding the data other than the image data and recording said data on the same recording medium on which the image data is recorded. Accordingly, various non-image data can easily be recorded as desired and, in addition, the area of the recording medium required for recording them is very small compared with that for the image data. Further, the operator can determine at his discretion whether to display these non-image data at the time of image reproduction or to conduct compensation for image reproduction based on the compensation data. Therefore, with the electronic camera in accordance with the present invention, it is possible to record a large quantity of desired data on the recording medium, which is not possible with the conventional data recording type camera in which data is optically recorded on a photosensitive photographic material and in which the recorded data cannot be removed from the reproduced image. Further, the electronic camera in accordance with the present invention allows accurate compensation of the reproduced image because the reproduced image can be obtained as compensated by compensation data for image reproduction.

I claim:

1. An electronic camera comprising a photographic lens, an image pickup device having a plurality of picture elements for receiving image information from said photographic lens and converting said image information into an electric image data output signal, and a mechanism for recording said image data output signal from said image pickup device on a recording medium, characterized in that said camera is provided with means for recording data other than said image information on the same recording medium as said recording medium on which said image information is recorded, said data other than said image information comprising defective picture element address data for indicating the position of any defective picture elements in said image pickup device.

2. An electronic camera as defined in claim 1, wherein said means for recording data other than said image information includes means for encoding said data other than said image information and recording it on said same recording medium.

3. An electronic camera as defined in claim 1, wherein said data other than said image information further comprises information concerning the arrangement of a color filter array in the camera.

4. An electronic camera as defined in claim 1, wherein said data other than said image information further comprises information identifying the particular camera being used.

5. The electronic camera of claim 1 wherein said camera further comprises means for detecting the positions of any defective picture elements and for supplying corresponding defective picture element address data to said means for recording data other than said image information on said recording medium.

6. An electronic camera comprising a photographic lens, an image pickup device for receiving image information from said photographic lens and converting said image information into an electric image data output signal, and a mechanism for recording said image data output signal from said image pickup device on a recording medium, characterized in that said camera is provided with means for recording data other than said image information on the same recording medium as said recording medium on which said image information is recorded, said data other than said image information comprising color temperature data.

7. An electronic camera as defined in claim 6, wherein said means for recording data other than said image information includes means for encoding said data other than said image information and recording it on said same recording medium.

8. The electronic camera of claim 6 wherein said camera further comprises means for generating said color temperature data.

9. An electronic camera comprising a photographic lens, a shutter, an image pickup device for receiving image information from said photographic lens and converting said image information into an electric image data output signal, and a mechanism for recording said image data output signal from said image pickup device on a recording medium, characterized in that said camera is provided with means for recording data other than said image information on the same recording medium as said recording medium on which said image information is recorded, said data other than said image information comprising data from manual data input means for manually receiving certain data.

10. An electronic camera as defined in claim 9, wherein said means for recording data other than said image information includes means for encoding said data other than said image information and recording it on said same recording medium.

11. An electronic camera as defined in claim 9, wherein said certain data from said manual data input means comprises the shutter speed.

12. An electronic camera as defined in claim 9, wherein said certain data from said manual data input means comprises the aperture value.

13. An electronic camera as defined in claim 9, wherein said certain data from said manual data input means comprises the frame number of the film in the camera.

14. An electronic camera as defined in claim 9, wherein said certain data from said manual data input means comprises the location where the picture is taken.

15. An electronic camera as defined in claim 9, wherein said certain data from said manual data input means comprises the name of the photographer.

16. An electronic camera as defined in claim 9, wherein said certain data from said manual data input means comprises data identifying the object being photographed.

17. An electronic camera as defined in claim 9, wherein said certain data from said manual data input means comprises color temperature data.

18. An electronic camera as defined in claim 9, wherein said certain data from said manual data input means comprises an instruction signal such as a cipher.

19. An electronic camera as defined in claim 9, wherein said certain data from said manual data input means comprises miscellaneous memorandum information.

20. The electronic camera of claim 9, wherein said camera comprises said manual data input means for manually receiving certain data.

21. An electronic camera comprising a photographic lens, an image pickup device for receiving imge information from said photographic lens and converting said image information into an electric image data output signal, and a mechanism for recording said image data output signal from said image data pickup device on a recording medium, characterized in that said camera is provided with means for recording data other than said image information on the same recording medium as said recording medium on which said image imformation is recorded, said data other than said image information comprising data identifying the conditions under which the photograph is taken.

22. An electronic camera as defined in claim 21, wherein said means for recording data other than said image information includes means for encoding said data other than said image information and recording it on said same recording medium.

23. An electronic camera as defined in claim 21, wherein said data identifying the conditions comprises the shutter speed.

24. An electronic camera as defined in claim 21, wherein said data identifying the conditions comprises the aperture value.

25. An electronic camera as defined in claim 21, wherein said data identifying the conditions comprises the frame number of the film of the camera.

26. An electronic camera as defined in claim 21, wherein said data identifying the conditions comprises an identification code for discriminating between a continuous shooting mode and single shooting mode.

27. The electronic camera of claim 21 wherein said camera further comprises means for inputting said data identifying the conditions under which the photograph is taken and for supplying said data to said means for recording data other than image information on the recording medium.

28. An electronic camera as defined in claim 1, 6, 9, or 21, wherein said recording medium comprises magnetic means having a beginning portion for recording identification data and a plurality of frames following said beginning portion, each of said frames including a portion for recording said image information and a portion for recording said data other than said image information, said frames being separated from one another by synchronizing signals.

* * * * *